(12) United States Patent
Van Beek

(10) Patent No.: US 6,955,597 B2
(45) Date of Patent: Oct. 18, 2005

(54) APPARATUS FOR THRESHING LEGUMES

(75) Inventor: Cornelius Joannes Maria Van Beek, Dongen (NL)

(73) Assignee: Ploeger Agro B.V., Oud Gastel (NL)

( * ) Notice: Subject to any disclaimer, the term of this patent is extended or adjusted under 35 U.S.C. 154(b) by 86 days.

(21) Appl. No.: 10/748,136

(22) Filed: Dec. 31, 2003

(65) Prior Publication Data

US 2004/0224738 A1 Nov. 11, 2004

(30) Foreign Application Priority Data

Jan. 3, 2003 (NL) .............................................. 1022300

(51) Int. Cl.[7] .............................................. A01D 45/22
(52) U.S. Cl. .............................. 460/141; 460/1; 460/59
(58) Field of Search ................................. 460/141, 142, 460/131, 132, 8, 59, 62; 56/DIG. 10

(56) References Cited

U.S. PATENT DOCUMENTS

| | | | |
|---|---|---|---|
| 3,709,231 A | | 1/1973 | Looker et al. |
| 3,769,988 A | | 11/1973 | Burenga |
| 3,826,267 A | * | 7/1974 | Scribner .................... 460/142 |
| 4,229,932 A | * | 10/1980 | Persoons et al. ............. 56/13.5 |
| 5,372,547 A | | 12/1994 | Brown et al. |
| 5,718,629 A | * | 2/1998 | Davenport .................. 460/131 |
| 5,851,146 A | | 12/1998 | Schloesser |
| 6,481,441 B1 | * | 11/2002 | Cunningham ................ 131/319 |
| 6,579,172 B2 | * | 6/2003 | Lauer ......................... 460/101 |
| 6,592,453 B2 | * | 7/2003 | Coers et al. .................. 460/4 |

FOREIGN PATENT DOCUMENTS

| | | |
|---|---|---|
| DE | 24 54 315 | 5/1976 |
| EP | 1 208 734 | 5/2002 |

* cited by examiner

Primary Examiner—Meredith Petravick
(74) Attorney, Agent, or Firm—Oblon, Spivak, McClelland, Maier & Neustadt, P.C.

(57) ABSTRACT

An apparatus for threshing legumes has a frame, which is movable over a ground surface. A drum, which is rotatable about its at least substantially horizontally oriented axis of rotation, is mounted on the frame and has a drum surface provided with one or more openings. A main threshing element is disposed within the drum and is rotatable about its longitudinal axis, which extends at least substantially parallel to the axis of rotation of the drum. At least one auxiliary threshing element is disposed within the drum and is rotatable about its longitudinal axis, which extends at least substantially parallel to the axis of rotation of the drum. An additional conveying member is disposed within the drum for conveying the legumes to be threshed through the drum. The apparatus has a detection device that measures an angle of inclination of the apparatus with respect to the horizontal and a control device that control the additional conveying member on the basis of the measured angle of inclination.

10 Claims, 3 Drawing Sheets

APPARATUS FOR THRESHING LEGUMES

BACKGROUND OF THE INVENTION

The invention relates to an apparatus for threshing legumes, comprising a frame which is movable over a ground surface, in which frame a drum which is rotatable about its at least substantially horizontally oriented axis of rotation is mounted, the drum surface of which is provided with one or more openings, wherein a main threshing element is disposed within the drum, which main threshing element is rotatable about its longitudinal axis extending at least substantially parallel to the axis of rotation of the drum; wherein at least one auxiliary threshing element is disposed within the drum, which auxiliary threshing element is rotatable about its longitudinal axis extending at least substantially parallel to the axis of rotation of the drum, and wherein additional conveying means are disposed within the drum for conveying the legumes to be threshed through the drum.

A threshing apparatus as referred to in the introduction is known, for example from U.S. Pat. No. 5,372,547. In said known apparatus, the legumes or pods are crushed by the threshing elements, so that the pods are opened and a threshing mixture consisting of seeds and shells/pods is obtained. This mixture is to be carried out of the drum for further processing. In said US patent, the flow of product through the threshing drum is realised by additional conveying means disposed within the drum. The flow of the threshing mixture is now separated from the main threshing element, for which threshing element a simpler construction not comprising any specific adjustable or fixed threshing blades may now be used.

During operation, a component of motion not only in radial direction but also in longitudinal direction is imparted to the threshing mixture. The latter component of motion leads to a steady movement of the threshing mixture from one end of the threshing drum to the other. One drawback of the threshing apparatus described in said US patent is the irregular flow of the threshing mixture through the threshing drum in situations in which the threshing apparatus includes an angle with the horizontal or the ground surface. A horizontal position of the threshing drum is required—even in situations in which the ground surface is not flat—in order to obtain a proper flow of the threshing mixture through the threshing apparatus.

To solve this problem, Dutch patent application No. NL-89/01658 (in the name of the present applicant) uses a complex stabilisation system, which places the entire threshing apparatus, or at least the threshing drum, in a substantially horizontal orientation with respect to the ground surface, even in situations in which the ground surface (for example a field) is not flat but exhibits a slope. In the apparatus according to NL-89/01658, the flow of the threshing mixture is not realised by additional conveying means, as in U.S. Pat. No. 1-5,372,547, but it is largely determined by the angle at which the threshing blades extend with respect to the main threshing element.

In a very complex embodiment it is possible to adjust said angle so as to regulate the flow in this manner. As a result, it is no longer possible, however, or only to a limited extent, to actively adapt the angle of the threshing drum by using variable angles of inclination when the apparatus is moving over a sloping ground surface.

SUMMARY OF THE INVENTION

The object of the invention is to overcome the aforesaid drawbacks and to provide a threshing apparatus as referred to in the introduction, which threshing apparatus is of simpler construction and by means of which the flow of the threshing mixture through the threshing drum can be controlled in a simple and optimum manner, without all kinds of additional, complex and cost-increasing means being required.

According to the invention, the apparatus for threshing legumes is characterized in that the apparatus comprises detection means that measure an angle of inclination of the apparatus with respect to the horizontal, as well as control means that control the additional conveying means on the basis of the measured angle of inclination.

It is this aspect that renders the apparatus according to the invention extremely versatile, since it enables an optimum adjustment of the flow of the threshing material through the threshing drum, because the angle of inclination of the apparatus with respect to the ground surface no longer affects the flow of the threshing mixture.

Moreover, a significant simplification of the apparatus according to the invention is obtained in this manner. In the first place, a cheaper construction of the main threshing element may be used, since the threshing blades no longer need to be mounted at an (adjustable) angle on the cylinder. Furthermore, it is no longer necessary to provide all kinds of complex stabilisation systems for maintaining a horizontal orientation of the entire threshing drum during operation, since the conveying means can now be controlled in a simple manner in dependence on the angle of inclination.

According to another aspect of the invention, the detection means measure the angle of inclination of the apparatus with respect to the horizontal, seen in the longitudinal direction of the axis of rotation of the drum, whilst according to another aspect the detection means measure the angle of inclination of the apparatus with respect to the horizontal, seen in a direction perpendicular to the longitudinal direction of the axis of rotation of the drum. The two measurements of the angle of inclination may be used (separately or jointly) for realising an adequate control of the conveying means, in order to thus realise an optimum flow of the threshing mixture, irrespective of the angle of inclination of the apparatus with respect to the horizontal.

In the first embodiment, the detection means comprise an inclinometer, more in particular in the form of a mercury switch. It is also possible to implement other types of inclinometers, however.

In another embodiment of the threshing apparatus according to the invention, the detection means furthermore comprise a speed sensor for measuring the current driving speed of the conveying means.

In a very functional embodiment, the control means comprise a speed/angle of inclination profile, and the control means are arranged for deriving a desired driving speed of the conveying means in dependence on the measured angle of inclination, comparing the desired driving speed with the measured driving speed and driving the conveying means on the basis of said comparison.

The embodiment that implements the aforesaid two aspects of the invention provides a simple yet quick control of the conveying means, resulting in a threshing apparatus according to the invention that provides an optimum flow of the threshing mixture, irrespective of the current angle of inclination of the apparatus with respect to the horizontal.

A special embodiment of the apparatus according to the invention can be obtained if the conveying means are disposed near a part of the drum surface that moves downwards during operation. The conveying means may be rotatable about their longitudinal axis, which extends at least substantially parallel to the axis of rotation of the drum. The conveying means may also be disposed at different positions in this threshing drum, however.

More in particular, the conveying means can be driven in a direction opposed the direction of rotation of the drum.

In a specific embodiment, the conveying means are embodied as at least one screw conveyor.

DESCRIPTION OF THE DRAWINGS

The invention will now be explained in more detail with reference to a drawing, in which.

DETAILED DESCRIPTION

Figure 1:
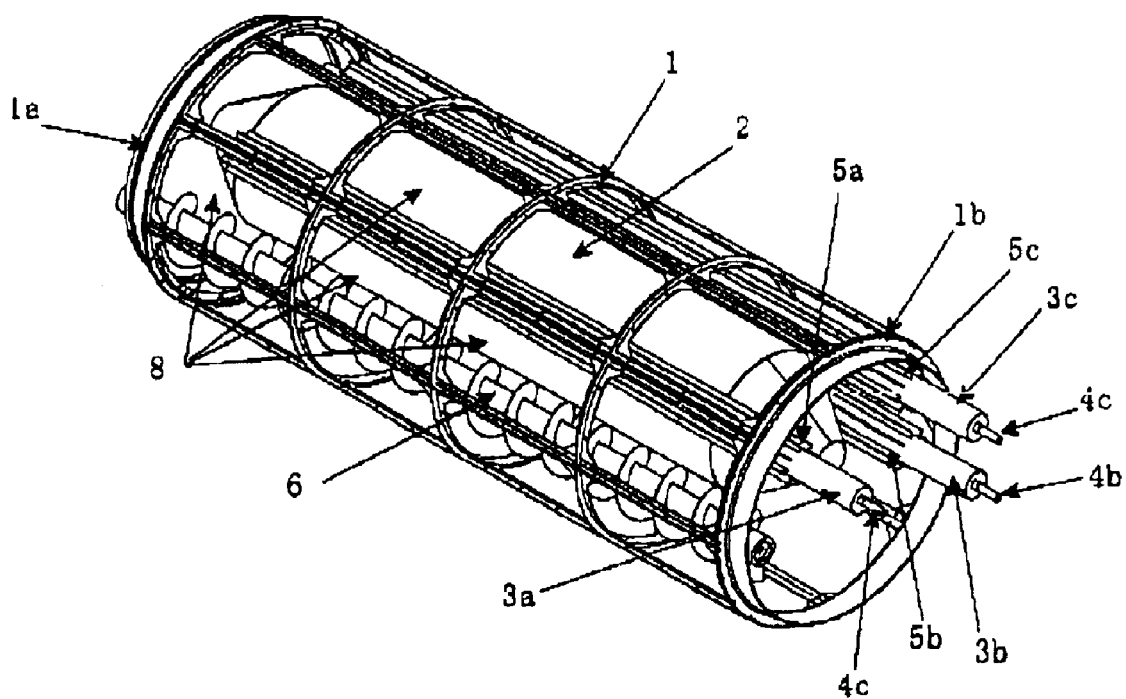
FIG. 1 shows a first embodiment of a prior art threshing apparatus.
Figure 2:
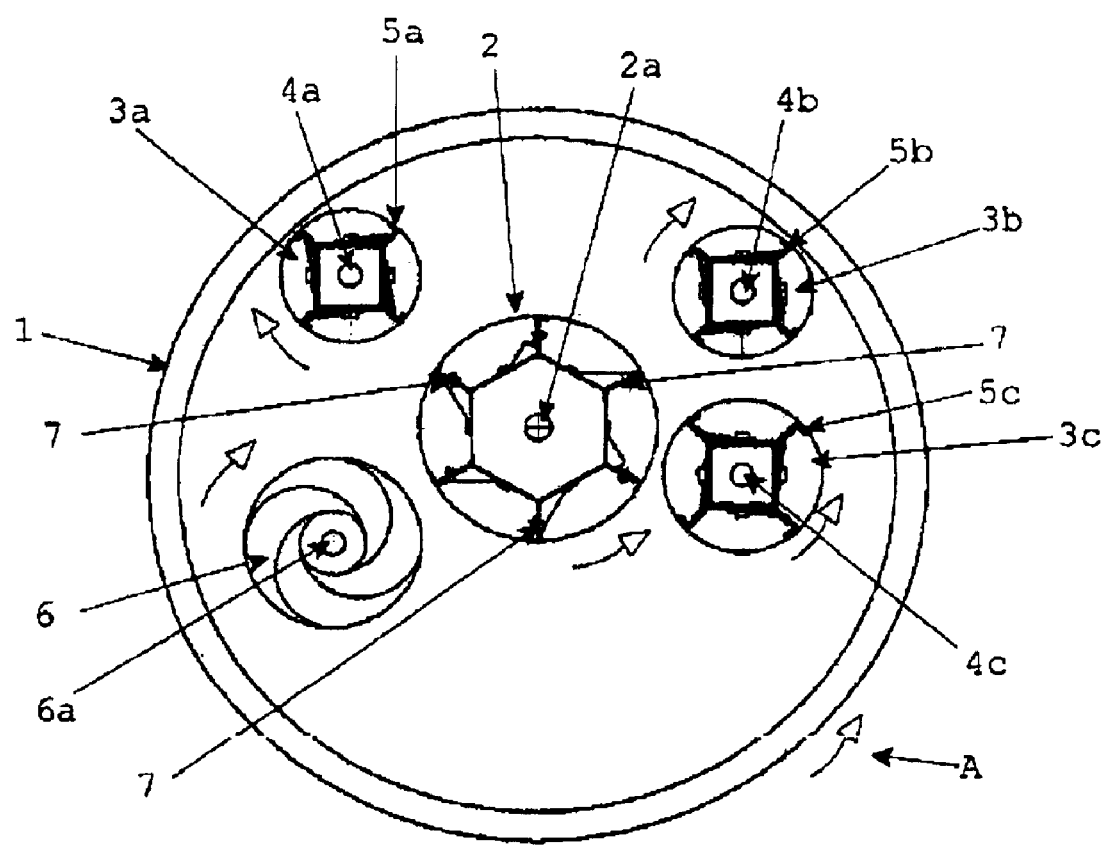
FIG. 2 shows a side elevation of the apparatus of FIG. 1.

FIGS. 1 and 2 show a general view and a side view, respectively, of a prior art threshing apparatus. Like parts are indicated by the same numerals in the two Figures.

The threshing apparatus comprises a threshing drum 1, which is mounted in a frame (not shown). Near its ends 1a and 1b, the drum 1 is supported by wheels (not shown), at least one of which can be rotated by driving means (not shown). Using said driving wheel (not shown), the drum 1 can be made to rotate in the direction indicated by the arrow A (see FIG. 2).

The surface of the threshing drum 1 is provided with several openings 8, which are fitted with screens that are known per se.

The threshing drum 1 is disposed in the threshing apparatus in such a manner that the axis of rotation or the longitudinal axis of the threshing drum extends at least substantially horizontally with respect to the ground surface. The legumes to be threshed may be introduced into the interior of the drum 1 near an end 1a thereof, using means not shown, whilst the emptied pods/shells, any leaves and the like may be discharged near the other end 1b of the drum 1.

Disposed within the threshing drum 1 is a main threshing element 2. Said main threshing element 2 has an elongate and substantially cylindrical body 2a, with outwardly extending blades 7 being mounted on the outer circumference of said body or cylinder 2a. The main threshing element 2 can be rotated about its longitudinal axis 2a by driving means (not shown), with the direction of rotation being indicated by the arrow near the main threshing element 2. During rotation, the blades 7 come into contact with the threshing mixture and the pods or shells are crushed or broken, so that a threshing mixture consisting of pods/shells and seeds is obtained. Preferably, but not necessarily, the threshing drum 1 and the main threshing element 2 rotate in the same direction during operation, as is indicated by the arrow A.

During operation, the blades 7 will lead the threshing mixture consisting of seeds and crushed pods/shells that has been formed in the direction of the inner surface of the threshing drum 1, towards the screens 8, where a first separation of the seeds and the crushed pods/shells is effected.

Auxiliary threshing means 3a–3b–3c are disposed within the threshing drum to assist in the threshing of the threshing mixture in the drum 1, which auxiliary threshing means 3a–3b comprise an elongate element, which is rotatable about a respective axis of rotation 4a–4c, in a direction of rotation as indicated by the arrow near each auxiliary threshing means. As FIGS. 1 and 2 show, each auxiliary threshing means is provided with elongate blades 5a–5c, which are mounted on the outer surface of the auxiliary threshing means 3a–3c. Preferably, the auxiliary threshing means 3a–3c are disposed near the inner surface of the threshing drum 1. The auxiliary threshing means 3a–3c are driven by driving means (not shown). The orientation of the auxiliary threshing means 3a–3c near the inner surface of the threshing drum 1 is such that the threshing mixture is moved along and rubbed against the inner surface of the threshing drum 1 by the blades 5a–5c during operation. This results in a further crushing of the threshing mixture and consequently in an improved separation of the seeds from the pods/shells.

As is shown in FIGS. 1 and 2, the threshing apparatus comprises additional conveying means 6, which move the threshing mixture consisting of crushed pods/shells and separated seeds from the first end 1a in the direction of the other end 1b of the threshing drum 1 during operation. The provision of additional conveying means in the threshing drum 1 results in a separation between the threshing action on the one hand and the conveying action on the other hand, which is effected by the main threshing element 2 in the threshing apparatuses that are known so far.

With the threshing apparatuses that are presently known, the blades 7 extend at an angle to the longitudinal axis 2a of the main threshing element 2, so that said blades impart a component of motion to the threshing mixture in the direction of the other end 1b of the threshing drum 1 during operation. Since the main threshing element is no longer responsible for the flow of the threshing mixture through the drum 1, it is possible to use a simpler and cheaper construction for the main threshing element, since it is no longer necessary to mount the blades 7 at an angle to the surface of the main threshing element 2, but simply perpendicularly thereto.

Preferably, the conveying means are driven by driving means (not shown in FIGS. 1 and 2), so that they are rotated about their longitudinal axis 6a, more particularly in a direction opposed to the direction of rotation of the threshing drum 1 as indicated by the arrow A. In a specific embodiment, which is also shown in FIGS. 1 and 2, the conveying means 6 are embodied as a screw conveyor.

Although it is possible to effect an improved flow of the threshing mixture through the threshing drum when using this construction of a threshing apparatus according to the prior art, said flow is far from optimal. With the threshing apparatuses that are known so far, the flow is still strongly affected by the angle of inclination of the threshing apparatus, more particularly of the threshing drum 1 thereof, with respect to the horizontal (the ground surface).

In particular in the case of a sloping ground surface, the threshing drum 1 will no longer be disposed horizontally, and the force of gravity will either oppose or enhance the flow of the threshing mixture, which is undesirable in either case, because it leads to an inefficient threshing action and an incomplete separation of the seeds from the crushed pods-shells. With the threshing apparatuses that are known so far, the entire threshing apparatus, or at least the threshing drum 1 thereof, is oriented substantially horizontally during operation, which is effected by using complex and costly stabilisation means.

The flow of the mixture through the threshing drum 1 can be adjusted in a simple manner by controlling or adjusting the conveying means 6 in accordance with the invention. This aspect, viz. the adjustment of the flow of the threshing mixture by the conveying means in dependence on the angle of inclination with respect to the horizontal, is used in the threshing apparatus according to the invention.

More specifically, the threshing apparatus according to the invention in particular makes it possible to adapt the rate of flow of the threshing mixture to the angle of inclination of the threshing drum 1 with respect to the horizontal or to the ground surface.

Figure 3:
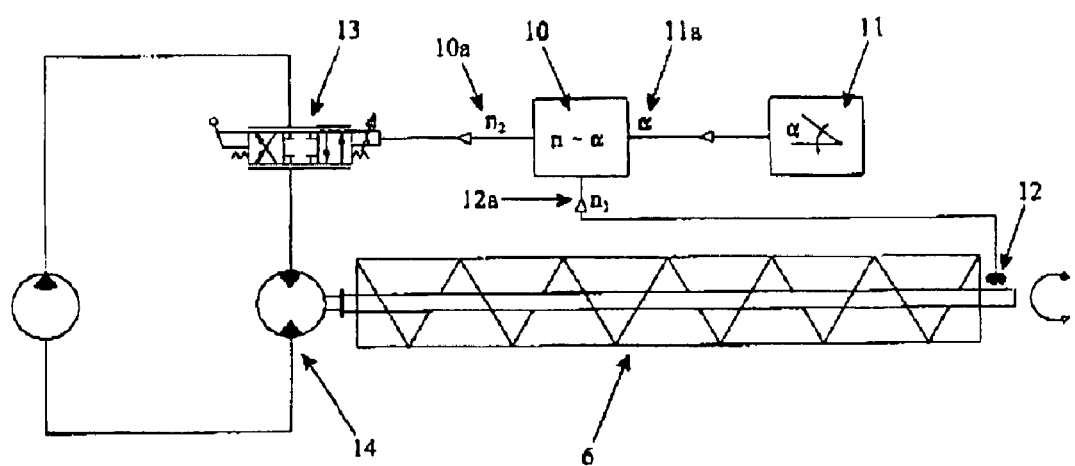
FIG. 3 shows an embodiment of a threshing apparatus according to the invention.

One embodiment of such a threshing apparatus according to the invention is schematically shown in FIG. 3. This embodiment according to the invention makes it possible to obtain the desired flow of the threshing mixture through the threshing drum 1 at all times, irrespective of the angle of the threshing drum 1 with respect to the horizontal or to the ground surface, even when the threshing apparatus is being operated on a sloping ground surface.

In order to enable a suitable control of the conveying means 6 in dependence on the angle at which the apparatus is disposed with respect to the horizontal/ground surface, the threshing apparatus according to the invention as schematically shown in FIG. 3 comprises detection means 11, which are arranged for measuring at least one angle of inclination $\alpha$ of the threshing apparatus with respect to the horizontal or to the ground surface.

The angle of inclination $\alpha$ may be the angle that the threshing apparatus according to the invention includes with the ground surface, seen in the longitudinal direction of the axis of rotation of the threshing drum 1. On the other hand, the measured angle of inclination a may be the angle that the threshing apparatus includes with the ground surface, seen in a direction perpendicular to the longitudinal direction of the axis of rotation of the threshing drum 1.

The detection means may comprise one or more suitable inclinometers 11, which generate a signal representative of the measured angle of inclination $\alpha$ of the threshing apparatus with respect to the horizontal/ground surface. One such inclinometer 11 is shown in FIG. 3 according to the invention, however, several inclinometers 11, each capable of measuring a different angle of inclination, may be implemented in the threshing apparatus.

The threshing apparatus according to the invention furthermore comprises control means 10, which receive the signals 11a (representative of the prevailing angle of inclination a between the threshing apparatus and the ground surface) delivered by the (various) inclinometers 11. The detection means furthermore comprise a sensor 12, which detects the current rotational speed $n_1$ of the conveying means (screw conveyor) 6 and delivers a representative measuring signal 12a to the control means 10.

The control means 10 are provided with a speed/angle of inclination profile (n~$\alpha$), which profile is stored, for example in the form of a table, on a storage medium such as an EEPROM or other memory element, or in the form of a computer programme, which is run on a computer. The profile shows or describes the dependence of the desired flow rate of the product, and more in particular the number of revolutions n of the conveying means 6 in relation to the angle of inclination $\alpha$ of the threshing apparatus with respect to the ground surface/horizontal.

According to the invention, the control means determine the associated, desired number of revolutions $n_2$ of the conveying means 6 on the basis of the signal 11a delivered by the inclinometer 11. Said desired number of revolutions $n_2$ is compared with the measured current number of revolutions $n_1$ of the conveying means, and the control means 10 will control the drive unit 14 on the basis of the difference between the desired and the measured numbers of revolutions, in order to thus impose the eventually required number of revolutions $n_2$ that is associated with the measured current angle of inclination on the conveying means 6.

In this way it is possible to control and adjust the flow rate of the product through the threshing drum 1 in a simple manner in dependence on the measured current angle of inclination $\alpha$ of the threshing apparatus according to the invention with respect to the ground surface/horizontal. The control means 10 continuously receive measuring signals 11a and 12a representative of the measured angle of inclination a and the current number of revolutions $n_1$ of the conveying means 6, and controls the driving unit 14 of the conveying means 6 on the basis of the detected differences between the measured number of revolutions $n_1$ and the desired number of revolutions $n_2$ (associated with the measured angle of inclination $\alpha$).

In FIG. 3, the conveying means 6 are driven by means of a hydraulic driving system 14, in which the control means 10 drive a control valve 13 for adjusting the desired number of revolutions $n_2$ of the conveying means 6 (and consequently the flow rate of the product through the threshing drum) by means of the drive unit 14.

More specifically, when the threshing apparatus is moving over an upwardly sloping ground surface in a specific situation, the control means 10 will drive the conveying means 6 at a greater rotational speed $n_2$ on the basis of the measured angle of inclination $\alpha$ in order to thus compensate the opposing effect of the force of gravity on the flow rate.

Likewise, the control means 10 will drive the conveying means 6 at a lower rotational speed $n_2$ when the threshing apparatus is moving over a downwardly sloping ground surface, in order to thus oppose the enhancing effect of the force of gravity on the flow rate of the threshing mixture.

In either situation a simple threshing apparatus can be obtained, which does not require any additional, complex and costly stabilisation means that are difficult to control and/or adjust, which stabilisation means impose a horizontal position on the threshing drum 1 or on the entire threshing apparatus at all times in the threshing apparatuses that are known so far. When using the present invention, the threshing apparatus or the threshing drum 1 does not necessarily have to take up a horizontal orientation with respect to the ground surface/horizontal, but the flow rate of the product through the threshing drum is controlled independently of the actual angle of inclination, so that an optimum threshing result is obtained.

It will be apparent that this embodiment provides a simple and cheaper threshing apparatus, in which the flow of the threshing mixture through the threshing drum 1 can be controlled at all times, in dependence on the threshing result in the threshing drum on the one hand and on the angle of the threshing drum 1 with respect to the horizontal on the other hand.

What is claimed is:

1. Apparatus for threshing legumes, comprising a frame which is movable over a ground surface, in which frame a drum which is rotatable about its at least substantially horizontally oriented axis of rotation is mounted, the drum surface of which is provided with one or more openings, wherein a main threshing element is disposed within the drum, which main threshing element is rotatable about its longitudinal axis extending at least substantially parallel to the axis of rotation of the drum;

wherein at least one auxiliary threshing element is disposed within the drum, which auxiliary threshing element is rotatable about its longitudinal axis extending at least substantially parallel to the axis of rotation of the drum, and wherein additional conveying means are disposed within the drum for conveying the legumes to be threshed through the drum, wherein the apparatus comprises detection means that measure an angle of inclination of the apparatus with respect to the horizontal, as well as control means that control the additional conveying means on the basis of the measured angle of inclination.

2. A threshing apparatus according to claim 1, wherein the detection means measure the angle of inclination of the apparatus with respect to the horizontal, seen in the longitudinal direction of the axis of rotation of the drum.

3. A threshing apparatus according to claim 1, wherein the detection means measure the angle of inclination of the apparatus with respect to the horizontal, seen in a direction perpendicular to the longitudinal direction of the axis of rotation of the drum.

4. A threshing apparatus according to claim 1, wherein said detection means comprise an inclinometer.

5. A threshing apparatus according to claim 4, wherein said inclinometer is embodied as a mercury switch.

6. A threshing apparatus according to claim 2, wherein the detection means furthermore comprise a speed sensor for measuring the current driving speed of the conveying means.

7. A threshing apparatus according to claim 6, wherein the control means comprise a speed/angle of inclination profile, and in that the control means are arranged for deriving a desired driving speed of the conveying means in dependence on the measured angle of inclination, comparing the desired driving speed with the measured driving speed and driving the conveying means on the basis of said comparison.

8. A threshing apparatus according to claim 1, wherein the conveying means are disposed near a part of the drum surface that moves downwards during operation.

9. A threshing apparatus according to claim 1, wherein the conveying means are rotatable about their longitudinal axis, which extends at least substantially parallel to the axis of rotation of the drum.

10. A threshing apparatus according to claim 1, characterized in that the conveying means can be driven in a direction opposed to the direction of rotation of the drum.

* * * * *